Figure 1:
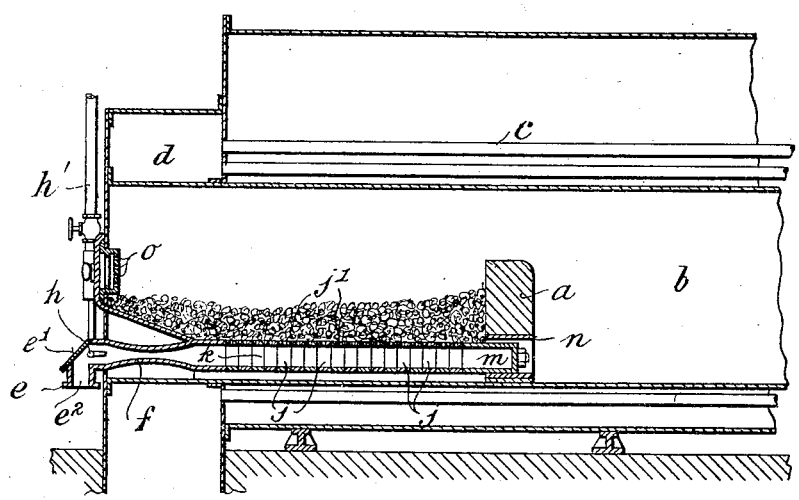

No. 862,598. PATENTED AUG. 6, 1907.
G. & T. WILTON.
FURNACE.
APPLICATION FILED JUNE 10, 1905.

2 SHEETS—SHEET 1.

WITNESSES:
Fred White
Rene Muire

INVENTORS:
George Wilton and Thomas Wilton,
By Attorneys
Arthur C. Fraser & Co

No. 862,598. PATENTED AUG. 6, 1907.
G. & T. WILTON.
FURNACE.
APPLICATION FILED JUNE 10, 1905.

2 SHEETS—SHEET 2.

WITNESSES:
Fred White
Rene Priime

INVENTORS.
George Wilton and Thomas Wilton,
By their Attorneys
Arthur C. Fraser & Co.

UNITED STATES PATENT OFFICE.

GEORGE WILTON, OF LONDON, AND THOMAS WILTON, OF BECKTON, LONDON, ENGLAND.

FURNACE.

No. 862,598.  Specification of Letters Patent.  Patented Aug. 6, 1907.

Application filed June 10, 1905. Serial No. 264,600.

*To all whom it may concern:*

Be it known that we, GEORGE WILTON, a subject of the King of Great Britain and Ireland, and residing in London, England, engineer, and THOMAS WILTON, a subject of the King of Great Britain and Ireland, and residing in Beckton, London, England, engineer, have invented certain new and useful Improvements in or Relating to Furnaces, of which the following is a specification.
This invention has for its subject a system of furnace which allows of employing all kinds of fuel, and particularly poor and pulverulent fuels combined or not with oil fuel, the invention insuring an efficient employment of such fuels. Furnaces of this type are capable of industrial applications of every kind for boilers, furnaces, etc.

The furnace forming the subject of this invention and relating to pulverulent fuels has no fire grate; the air necessary for sustaining the combustion and for raising the fuel to incandescence is supplied by pipes of the special form and construction hereinafter described disposed longitudinally in the base of the furnace and pierced with holes at the upper part, so that the air blown into these pipes issues under pressure and passes through the fuel to maintain combustion thereof. The air blown into the tubes which form the base of the furnace is impelled through the medium of steam jets acting as injectors at the mouth of the air pipes. Thus a mixture of air and steam under the influence of the heat is admitted through the bed of ignited fuel, which is preferably from 12 to 14 inches thick more or less; the steam is decomposed and combustible gas similar to water gas is formed, so that a considerable proportion of the gas thus produced in escaping from the incandescent fuel produces a very active combustion which is prolonged up into the flues of the furnace or into the tubes of the boiler to which the furnace is applied. The said lower tubular surface of the furnace is so constructed and arranged that it completely covers or extends over the entire width of the furnace, and leaves no space at the sides in which fuel could become lodged, as the lodgment of fuel in spaces or cavities below the upper surface of the blast pipes is found to cause burning away of the side of the blast pipe and any gaps left between the pipes and the walls of the flues would result in loss of efficiency.

Figure 2:
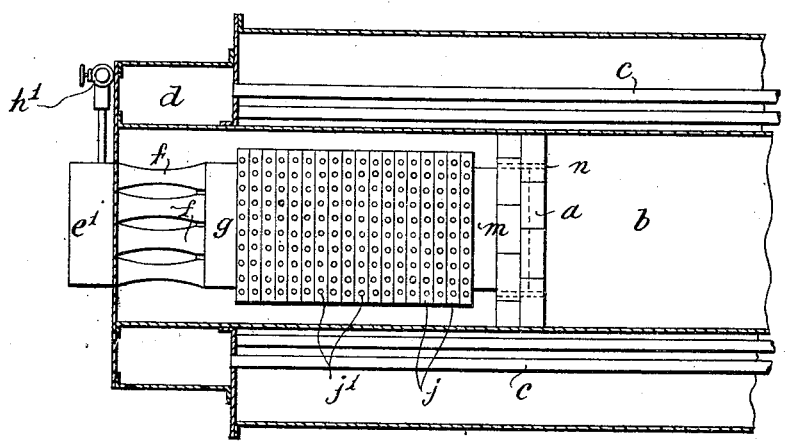
Figure 3:
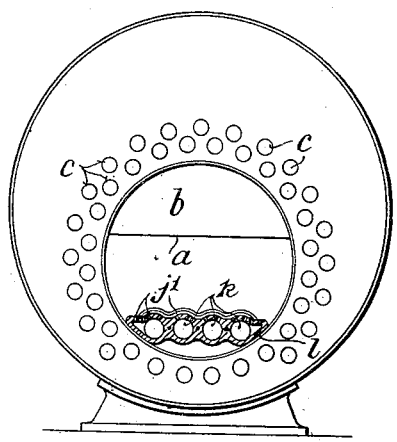
Figure 5:
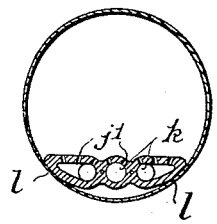
Figure 4:
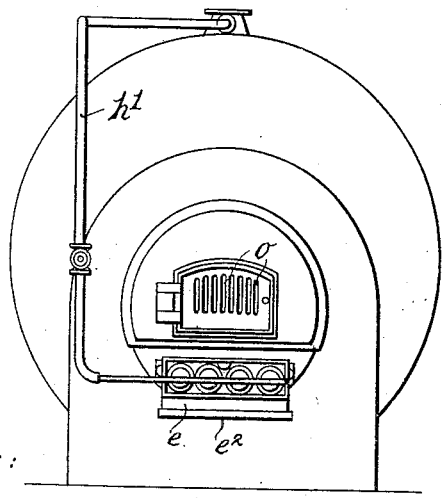
Figure 6:

In the accompanying drawings Figures 1 and 2 illustrate respectively in longitudinal section and part sectional plan the improved furnace applied to a Cornish boiler, Fig. 3 is a cross sectional elevation of Fig. 1, Fig. 4 is a front elevation of Fig. 1, and Figs. 5 and 6 are cross sections of modified forms.

The boiler shown in Figs. 1 to 4 is an internal flue boiler with return fire tubes; the gases evolved from the ignited fuel pass over the fire bridge $a$ into the internal flue $b$ and thence to the rear end of the boiler and return by the tubes $c$ whence they escape to the chimney shaft $d$. But as above explained this type of furnace can be employed for boilers of any other kind or for any other purpose.
As will be seen, there is no fire grate properly speaking, that is to say the fuel does not rest upon fire bars having spaces between them for the air to pass through so as to reach the ignited fuel and maintain its combustion. The bottom of the furnace is a continuous metal surface formed as follows:—$e$ is a part formed of cast iron or steel in the shape of a box and designed to be disposed in front of the furnace and outside the same; this has a top $e^1$ and is open at bottom at $e^2$. This box or casing $e$ is formed with four nozzles $f$ each having the shape of reversed cones arranged with their small ends facing one another, these nozzles terminating at the other end in a connecting chamber $g$ provided with as many openings as there are nozzles $f$. Opposite each of the nozzles $f$ and at the center thereof is arranged a steam jet $h$; these jets are supplied by a single branch pipe $h^1$ connected with the steam dome or steam space of the boiler. These steam jets produce a powerful draft of air through the lower opening $e^2$ of the casing $e$, and this air thus drawn in and mixed with the steam, after passing through the conical nozzles penetrates under pressure through the thick bed of ignited fuel as will now be described.

Beyond the chamber $g$ are disposed a series of sections $j$ in greater or less number according to the length of the furnace, these sections which are perforated at their upper surfaces as at $j^1$ have as many holes or openings $k$ as there are nozzles $f$. They are shaped laterally as seen in Fig. 3 in such manner as to rest against the inner walls $l$ of the furnace. The outside blast pipes or the sections which form the same are extended to more or less follow the contour of the flue and so extend the blast pipe right up to the face of the flue, and at the same time provide such a support for the fuel that it does not rest in any deep cavities below the normal level of the upper surface of the blast pipe. By this means burning away of the sections is reduced to a minimum and the life thereof is increased.

It will be seen that the side sections are extended on their underside in the form of a curve corresponding to the curve of the circular flue (Figs. 3 and 5), the upper surface which supports the fuel is extended laterally until it meets the curved underside so that in section the blast pipes are curved on one side and flat on the other.

It would be very undesirable to form the blast pipes with metal wings extending across the recesses at the side as such would inclose an empty space, and it is not practical to employ the said inclosed space for introducing the blast because of the leakage of air which would occur at the joint between the plate and the flue, and more especially such an arrangement could not be practically employed with a corrugated flue or with a flue having expansion rings. Apart from this the plate could not stand the wear and tear in the same manner as that of the form herein described, but by the improved formation of blast pipe section the said space is inclosed and utilized by the extended portion of the blast pipe.

At the rear end of the blast pipe sections is arranged a box or chamber *m* which passes freely into a casing of the same shape *n* mounted in the brickwork of the furnace. The bottom of the furnace therefore rests at the forward end upon the furnace front and at the back in the casing *n* of the fire bridge *a* which allows of free expansion of the bottom of the furnace from front to back. Longitudinal bolts are fitted in the holes formed in the parts *g, j, m* between the longitudinal tubes *k*, and serve as ties to unite the various elements of the bottom of the furnace. Openings *o* formed in the door of the furnace serve to admit air to insure the complete ignition of the gas formed by the decomposition of the steam. The number of longitudinal cavities *k* formed in the sections *j* can be varied; in Figs. 1 to 4 it is supposed that there are four longitudinal holes, the lateral orifices being of angular form at the side so as to follow the shape of the furnace. If desired (see Fig. 5) only one central hole might be employed, and two angular orifices at the sides; or (Fig. 6) two orifices of angular shape might be arranged oppositely to one another. This would depend upon the dimensions of the furnace.

What we claim and desire to secure by Letters Patent is:

1. A blast pipe for furnaces adapted to fit the furnace flue and formed of a number of sections having lateral passages, such sections being arranged with their passages connecting, thereby in effect forming an extended blast pipe, each of such sections having a substantially flat upper wall extending close to the sides of the flue, and a lower wall following substantially the contour of the flue, and meeting the upper wall close to the sides of the flue, said upper wall and lower wall forming an inclosed blast passage close to the sides of the flue but separated therefrom by such walls, and said upper wall being perforated close to the sides of the flue.

2. The improved furnace comprising the combination of a furnace flue, and a blast pipe formed of a number of sections having lateral passages, such sections being arranged with their passages connecting, thereby in effect forming an extended blast pipe, each of such sections having a substantially flat upper wall extending close to the sides of the flue, and a lower wall following substantially the contour of the flue and meeting the upper wall close to the sides of the flue, said upper wall and lower wall forming an inclosed blast passage close to the sides of the flue but separated therefrom by such walls, and said upper wall being perforated close to the sides of the flue.

3. A blast pipe for furnaces adapted to fit the furnace flue and formed of a number of sections having lateral passages, such sections being arranged with their passages connecting, whereby in effect forming an extended blast pipe, the lateral passages of each section including a centrally arranged blast passage, and on each side thereof a triangular-shaped inclosed blast passage extending close to the side wall of the flue, each section having a substantially flat upper wall, and a lower wall following substantially the contour of the flue and meeting the upper wall close to the sides of the flue and forming with such upper wall said triangular-shaped passages, said upper wall being perforated to permit the blast to escape from said last named passages.

4. The improved furnace comprising the combination of a furnace flue, and a blast pipe formed of a number of sections having lateral passages, such sections being arranged with their passages connecting, thereby in effect forming an extended blast pipe, each of such sections having a substantially flat upper wall extending close to the sides of the flue, and a lower wall following substantially the contour of the flue and meeting the upper wall close to the sides of the flue, said upper wall and lower wall forming an inclosed blast passage close to the sides of the flue but separated therefrom by such walls, and said upper wall being perforated close to the sides of the flue, a double coned or flared entrance to each of said blast passages, and steam jets adapted to force air through said double coned entrances into said blast passages.

5. A blast pipe for furnaces adapted to fit the furnace flue and formed of a number of sections having lateral passages, such sections being arranged with their passages connecting, thereby in effect forming an extended blast pipe, each section having a substantially flat upper wall extending close to the sides of the flue, and a lower wall meeting the upper wall close to each side of the flue, said walls forming between them at each side of the section a blast passage which is close to the side of the flue, but which is separated from the flue by said walls, one of said walls being perforated close to the sides of the flue so that the blast issues from said passages into the flue near the sides of the latter.

In witness whereof, we have hereunto signed our names in the presence of two subscribing witnesses.

GEORGE WILTON.
T. WILTON.

Witnesses:
H. D. JAMESON,
FREDK. L. RAND.